(12) United States Patent
Yuki

(10) Patent No.: US 8,886,375 B2
(45) Date of Patent: Nov. 11, 2014

(54) CONTROL APPARATUS FOR ELECTRIC VEHICLE

(75) Inventor: Minoru Yuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 597 days.

(21) Appl. No.: 12/760,890

(22) Filed: Apr. 15, 2010

(65) Prior Publication Data

US 2010/0268408 A1 Oct. 21, 2010

(30) Foreign Application Priority Data

Apr. 20, 2009 (JP) ................................. 2009-101876

(51) Int. Cl.

| | |
|---|---|
| *B60L 9/00* | (2006.01) |
| *B60T 8/1763* | (2006.01) |
| *B60L 7/16* | (2006.01) |
| *B60L 7/24* | (2006.01) |
| *B60T 1/10* | (2006.01) |

(52) U.S. Cl.
CPC .............. *B60T 8/17636* (2013.01); *B60L 7/16* (2013.01); *B60L 7/24* (2013.01); *B60T 1/10* (2013.01); *B60L 2240/24* (2013.01); *B60L 2240/461* (2013.01); *B60L 2240/465* (2013.01); *B60T 2270/402* (2013.01); *B60T 2270/602* (2013.01); *B60W 2520/28* (2013.01); *Y02T 10/7258* (2013.01)
USPC ........................... 701/22; 180/65.21; 303/152

(58) Field of Classification Search
CPC ............... B60L 7/10; B60L 7/12; B60L 7/14; B60L 3/108; B60L 7/16; B60L 7/18; B60L 7/26; B60L 11/14; B60L 3/10; B60L 3/102; B60W 10/08; B60W 10/184; B60W 30/18127; B60W 20/00; B60W 2520/26; B60W 2520/263; B60W 2520/266
USPC ........................... 701/22; 180/65.21; 303/152
See application file for complete search history.

(56) References Cited

U.S. PATENT DOCUMENTS

| 6,086,166 | A * | 7/2000 | Fukasawa ...................... 303/152 |
|---|---|---|---|
| 7,500,534 | B2 * | 3/2009 | Hommi ......................... 180/197 |
| 2007/0108838 | A1 * | 5/2007 | Shaffer et al. ................. 303/152 |

FOREIGN PATENT DOCUMENTS

| JP | 10-297462 A | 11/1998 |
|---|---|---|
| JP | 11-004503 A | 1/1999 |

* cited by examiner

*Primary Examiner* — John Q Nguyen
*Assistant Examiner* — Jordan S Fei
(74) *Attorney, Agent, or Firm* — McDermott Will & Emery LLP

(57) ABSTRACT

When a diagnosis result of an ABS control system is normal, a determination is made as to whether or not to execute ABS control based on a slip ratio of a vehicle wheel, whereupon motor torque control is executed based on an operational state of an ABS. In other words, when ABS control is not executed, the motor-generator is controlled to a regenerative state, and when ABS control is executed, the motor-generator is controlled to a power running state. When the diagnosis result of the ABS control system is abnormal, on the other hand, regenerative braking by the motor-generator is prohibited immediately and the motor-generator is controlled to the power running state.

6 Claims, 5 Drawing Sheets

(A) Normal (B) Abnormal

US 8,886,375 B2

CONTROL APPARATUS FOR ELECTRIC VEHICLE

CROSS-REFERENCE TO RELATED APPLICATIONS

The present application claims priority from Japanese Patent Application No. 2009-101876 filed on Apr. 20, 2009, and is hereby incorporated by reference in its entirety.

BACKGROUND OF THE INVENTION

1. Field of the Invention

The present invention relates to a control apparatus for an electric vehicle which includes a brake control device for stabilizing a vehicle behavior by controlling a friction brake of a vehicle wheel.

2. Description of the Related Art

In an electric vehicle including an electric motor for driving a vehicle wheel, the electric motor is operated as a power generator during vehicle braking such that the vehicle is braked using a regenerative torque generated by the electric motor. However, a braking force obtained by a regenerative brake employing an electric motor is affected by a battery characteristic and so on, and therefore a braking force of a required magnitude is typically secured with stability by employing a friction brake such as a disk brake alongside the regenerative brake. Further, when a regenerative brake and a friction brake are used in combination, it is important to coordinate the regenerative brake and the friction brake (see Japanese Patent Application Publication (JPA) No. 1999-4503 and Japanese Patent Application Publication No. 1998-297462, for example).

Incidentally, as described in JPA No. 1998-297462, an electric vehicle is also installed with a brake control device such as an antilock braking system (ABS). The brake control device estimates a vehicle behavior based on signals from a vehicle wheel speed sensor, an acceleration sensor, and so on, and stabilizes the vehicle behavior by operating the friction brake to control the braking force applied to each vehicle wheel. Furthermore, when the other brake control device such as the ABS is operative, torque control is executed on the electric motor simultaneously by a motor control unit. By controlling the electric motor in coordination with the brake control device in this manner, the vehicle behavior is further stabilized.

However, when an abnormality occurs in a control system such as the vehicle wheel speed sensor or a communication network, the motor control unit cannot learn the operational state of the brake control device, and therefore the brake control device and the electric motor cannot be coordinated easily. For example, when the coordinated control of the brake control device and the electric motor becomes difficult, a regenerative torque may be output from the electric motor even though ABS control is executed. When the electric motor is controlled in this manner, the vehicle wheels may lock, causing instability in the vehicle behavior, and as a result; a steering stability of the electric vehicle may deteriorate.

SUMMARY OF THE INVENTION

An object of the present invention is to improve the stability of an electric vehicle by controlling an electric motor appropriately even in cases where the coordinated control of a brake control device and the electric motor is difficult.

A control apparatus for an electric vehicle according to the present invention is a control apparatus for an electric vehicle having a brake control device for stabilizing a vehicle behavior by controlling a friction brake of a vehicle wheel, and includes: an electric motor that is controlled to a power running state in which the vehicle wheel is driven by a power running torque and a regenerative state in which the vehicle wheel is braked by a regenerative torque; slip determining means for determining whether or not to operate the brake control device based on a slipping tendency of the vehicle wheel; and a motor control means for controlling a driving state of the electric motor based on a determination result from the slip determining means, wherein the motor control means prohibits regenerative braking by the electric motor when it is determined that the determination result from the slip determining means is abnormal.

In the control apparatus for an electric vehicle according to the present invention, the motor control means controls the electric motor to a power running torque that is no greater than a predetermined value when it is determined that the determination result from the slip determining means is abnormal.

In the control apparatus for an electric vehicle according to the present invention, the power running torque of the electric motor is varied based on a traveling condition.

In the control apparatus for an electric vehicle according to the present invention, the motor control means controls a torque acting on the vehicle wheel toward zero by controlling the electric motor to the power running torque that is no greater than the predetermined value.

In the control apparatus for an electric vehicle according to the present invention, the brake control device is an antilock brake control device for preventing the vehicle wheel from locking during vehicle braking.

According to the present invention, regenerative braking by the electric motor is prohibited when it is determined that the determination result from the slip determining means is abnormal, and therefore the vehicle behavior can be stabilized, leading to an improvement in the stability of the electric vehicle.

DESCRIPTION OF THE PREFERRED EMBODIMENTS

Figure 1:
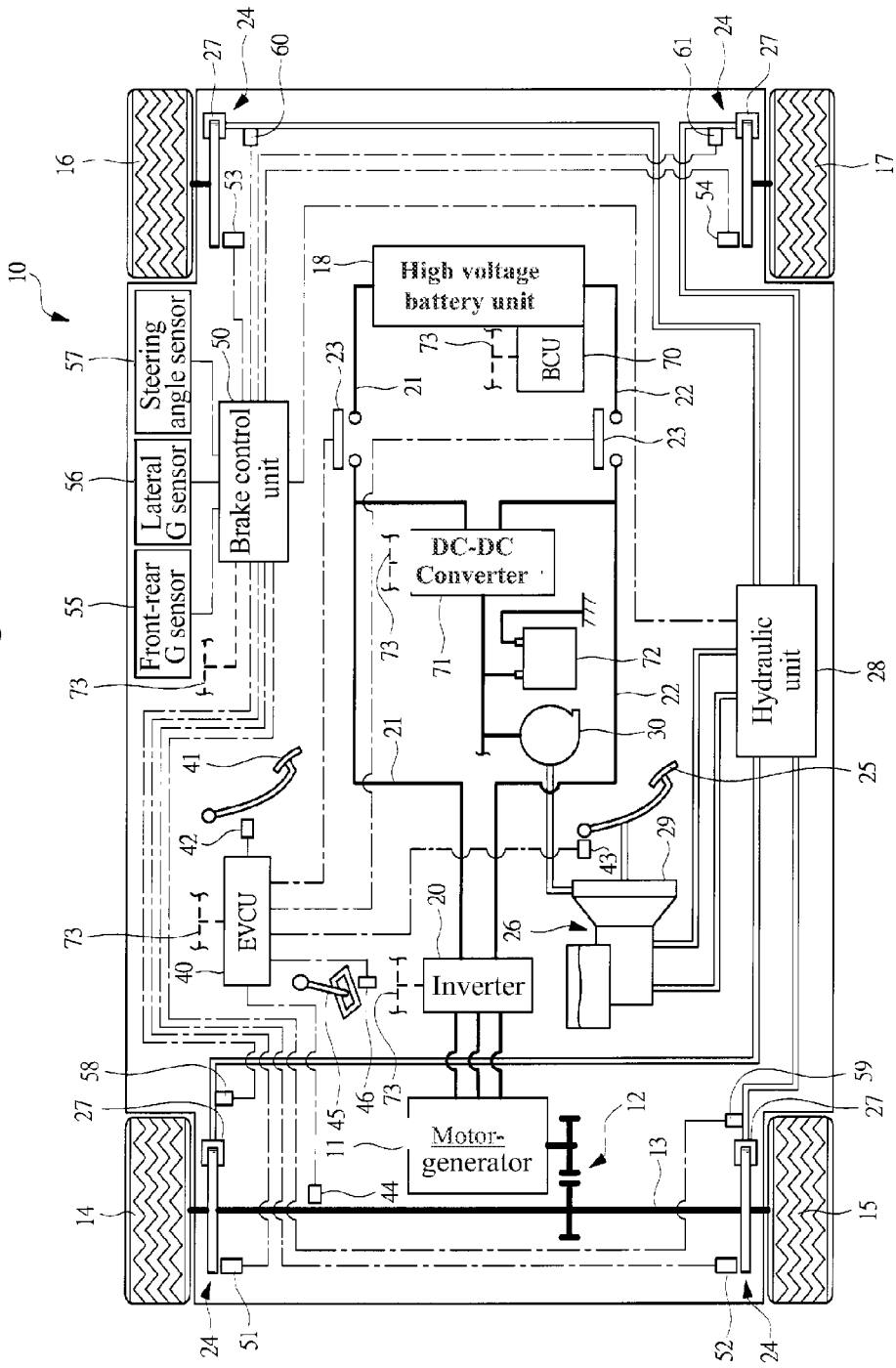
FIG. 1 is a schematic diagram showing the configuration of an electric vehicle.

An embodiment of the present invention will be described in detail below based on the drawings. FIG. 1 is a schematic diagram showing the configuration of an electric vehicle 10. The control apparatus for an electric vehicle according to an embodiment of the present invention is applied to the electric vehicle 10. As shown in FIG. 1, the electric vehicle 10 is provided with a motor-generator (electric motor) 11 for driving a vehicle wheel. A drive shaft 13 is coupled to the motor-generator 11 via a gear train 12, and vehicle wheels 14 and 15 are coupled to the drive shaft 13. When the motor-generator 11 is controlled to a power running state, the motor-generator 11 can be functioned as a motor that outputs power running torque, and as a result, the vehicle wheels 14 and 15 can be driven. When the motor-generator 11 is controlled to a regenerative state, on the other hand, the motor-generator 11 can be functioned as a power generator that outputs a regenerative torque, and as a result, the vehicle wheels 14 and 15 can be braked. The electric vehicle 10 is also provided with a high voltage battery unit 18 that functions as a power supply for the motor-generator 11. A 400V lithium-ion secondary battery, for example, is used as the high voltage battery unit 18.

An inverter 20 is connected to the motor-generator 11, and the high voltage battery unit 18 is connected to the inverter 20 via current-carrying cables 21 and 22. When the motor-generator 11 is driven as a motor, a direct current from the high voltage battery unit 18 is converted into an alternating current by the inverter 20, and this alternating current is supplied to the motor-generator 11. When the motor-generator 11 is driven as a power generator, on the other hand, an alternating current from the motor-generator 11 is converted into a direct current by the inverter 20, and this direct current is supplied to the high voltage battery 18 unit. Further, by controlling a current value and a frequency of the alternating current using the inverter 20, a torque and a rotation speed of the motor-generator 11 can be controlled. Note that a main relay 23 is provided on the current-carrying cables 21 and 22 connected to the high voltage battery unit 18.

Further, a friction brake 24 for braking the respective vehicle wheels 14 to 17 is provided in the electric vehicle 10. The friction brake 24 includes a master cylinder 26 that generates oil pressure in accordance with depression of a brake pedal 25 by a driver, and calipers 27 that brake the respective vehicle wheels 14 to 17 using the oil pressure from the master cylinder 26. Further, a hydraulic unit 28 for controlling (increasing, maintaining and reducing) the oil pressure supplied to the respective calipers 27 is provided between the master cylinder 26 and the calipers 27. The hydraulic unit 28 is comprised of a plunger pump, a solenoid valve, a reservoir, and so on, which are not shown in the drawing. Further, a vacuum booster 29 is attached to the master cylinder 26, and an electric vacuum pump 30 is connected to the vacuum booster 29. Note that the friction brake 24 shown in the drawing is a disk brake, but the present invention is not limited thereto, and a drum brake may be provided as the friction brake 24 instead.

The electric vehicle 10 is further provided with an electric vehicle control unit (EVCU) 40 that performs overall control of the electric vehicle 10. An accelerator pedal sensor 42 for detecting an operation amount of an accelerator pedal 41, a brake pedal sensor 43 for detecting an operation amount of the brake pedal 25, a vehicle speed sensor 44 for detecting a vehicle speed, a range switch 46 for detecting an operating position of a select lever 45, and so on are connected to the EVCU 40. Based on of various signals indicating the operation amount of the accelerator pedal 41, the operation amount of the brake pedal 25, the vehicle speed, the range position, and so on, the EVCU 40 sets a target torque and a target rotation speed of the motor-generator 11, and based on these target values, the EVCU 40 outputs a control signal to the inverter 20. In other words, the EVCU 40 functions as motor control means.

For example, the EVCU 40 sets the power running torque of the motor-generator 11 by referring to a power running torque map based on the vehicle speed and the operation amount of the accelerator pedal 41. Further, the EVCU 40 sets the regenerative torque of the motor-generator 11 by referring to a regenerative torque map based on the vehicle speed and the operation amount of the brake pedal 25. The EVCU 40 then determines the target torque by adding together the power running torque and the regenerative torque, and outputs a control signal to the inverter 20 based on the target torque. Note that when the accelerator pedal 41 and the brake pedal 25 are both depressed, the power running torque output from the motor-generator 11 may be limited by setting a limiting coefficient may be set in accordance with the operation amount of the brake pedal 25 and then multiplying the limiting coefficient by the power running torque.

Figure 2:
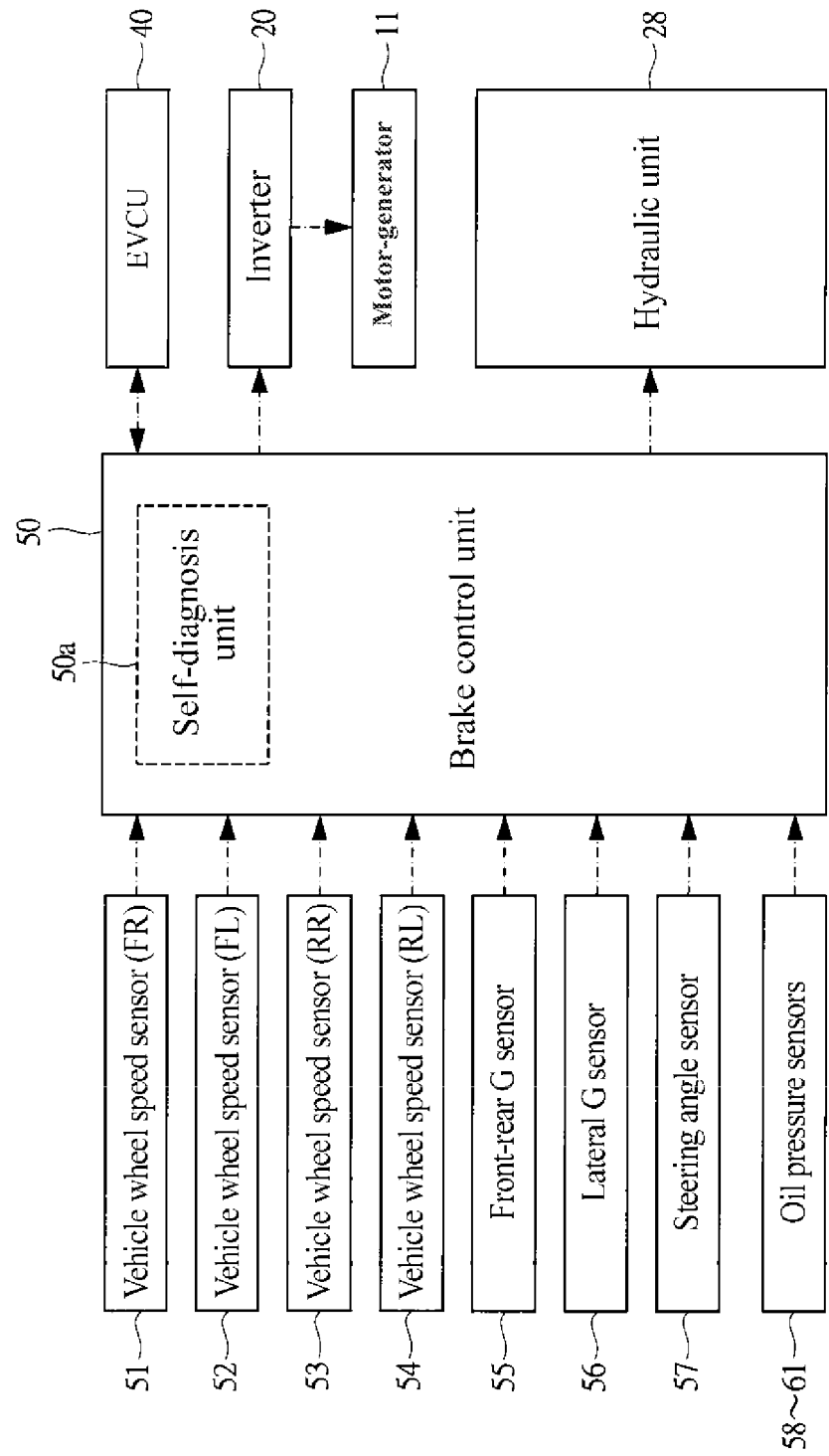
FIG. 2 is a block diagram showing connection states of various elements relative to a brake control unit.

The electric vehicle 10 is further provided with a brake control unit (ABSCU) 50 for controlling the operational state of the friction brake 24. FIG. 2 is a block diagram showing connection states of various elements relative to the ABSCU 50. As shown in FIGS. 1 and 2, vehicle wheel speed sensors 51 to 54 for detecting a rotation speed of the respective vehicle wheels 14 to 17 (vehicle wheel speeds), a front-rear G sensor 55 for detecting acceleration acting in a front-rear direction of the vehicle, a lateral G sensor 56 for detecting acceleration acting in a lateral direction of the vehicle, a steering angle sensor 57 for detecting a steering amount and a steering direction of a steering device, oil pressure sensors 58 to 61 for detecting an oil pressure of a brake pipe, and so on are connected to the brake control unit 50. Based on detection signals from the various sensors 51 to 61, the brake control unit 50 estimates a vehicle behavior and calculates a braking force to be applied to the respective vehicle wheels 14 to 17 in order to stabilize the vehicle behavior. The brake control unit 50 then adjusts the oil pressure supplied to the respective calipers 27 (to be referred to hereafter as brake oil pressure) by controlling the hydraulic unit 28 such that the braking force calculated in relation to each vehicle wheel 14 to 17 is obtained.

For example, during vehicle braking in which the brake pedal 25 is depressed, the brake control unit 50 estimates a vehicle body speed based on signals from the various sensors, and calculates a slip ratio of the vehicle wheels 14 to 17 based on the vehicle body speed and the vehicle wheel speed. When the slip ratio of the vehicle wheels 14 to 17 exceeds a predetermined threshold, or in other words when the vehicle wheels 14 to 17 exhibit a locking tendency, the brake control unit 50 drives the hydraulic unit 28 to control the brake oil pressure, thereby adjusting the braking force of the respective vehicle wheels 14 to 17 such that the vehicle behavior is stabilized. Hence, the friction brake 24 and the brake control unit 50 together constitute an antilock brake control device (brake control device) for preventing the vehicle wheels 14 to 17 from locking during vehicle braking, or in other words an antilock braking system (to be referred to hereafter as ABS). Further, when the brake oil pressure is reduced, in order to restore the vehicle wheels 14 and to a rotational state, a control signal is output from the EVCU 40 to the inverter 20 in accordance with the operational state of the ABS, whereby the motor-generator 11 is controlled to a power running state in which a predetermined power running torque is output.

Further, the brake control unit 50 calculates an intended target behavior of the driver based on detection signals from the steering angle sensor 57, the accelerator pedal sensor 42, the brake pedal sensor 43, and so on, and calculates an actual behavior of the vehicle based on signals from the front-rear G sensor 55, the lateral G sensor 56, the vehicle wheel speed sensors 51 to 54, and so on. The brake control unit 50 then determines a degree of understeer or oversteer based on the target behavior and the actual behavior, and when the brake control unit 50 determines that the vehicle wheels may slip due to a unstable vehicle behavior, the brake control unit 50 drives the hydraulic unit 28 to control the brake oil pressure, thereby adjusting the braking force applied to the respective vehicle wheels 14 to 17 such that the vehicle behavior is stabilized. By configuring a brake control device with the friction brake 24 and the brake control unit 50 in this manner, so-called vehicle dynamic control (to be referred to hereafter as VDC) is executed by the brake control device. Note that when the braking force of the vehicle wheels 14 to 17 is adjusted through VDC control, motor torque control is likewise performed on the motor-generator 11 simultaneously in order to stabilize the vehicle behavior.

As shown in FIG. 2, the brake control unit 50 is further provided with a self-diagnosis unit 50a for determining the presence of an abnormality in the ABS control system. For example, when the output voltage of the vehicle wheel speed sensors 51 to 54 deviates from a prescribed range, this indicates that the vehicle wheel speed sensors 51 to 54 are not functioning normally, and therefore the self-diagnosis unit 50a determines that an abnormality has occurred in the ABS control system. Further, during ABS control, the friction brake 24 and the motor-generator 11 are controlled in a coordinated fashion, and therefore the self-diagnosis unit 50a determines that an abnormality has occurred in the ABS control system also when a communication abnormality is found between the EVCU 40 and the brake control unit 50. Note that the diagnosis subject of the self-diagnosis unit 50a is not limited to a communication abnormality between the vehicle wheel speed sensors 51 to 54 and the units 40 and 50, and in a case, for example, where the front-rear G sensor 55, the lateral G sensor 56, the steering angle sensor 57, and so on are used for ABS control, the self-diagnosis unit 50a may determine the presence of an abnormality relating to the ABS control system in accordance with output signals from these sensors 55 to 57.

As shown in FIG. 1, the electric vehicle 10 is provided with a battery control unit (BCU) 70 for controlling charging and discharging of the high voltage battery unit 18. Further, a low voltage battery unit 72 is connected to the high voltage battery unit 18 via a DC-DC converter 71. A 12V lead storage battery, for example, is used for the low voltage battery unit 72. The low voltage battery unit 72 functions as a power supply for the inverter 20, the converter 71, and the respective control units 40, 50 and 70, and also functions as a power supply for an air-conditioning device, headlights and so on, not shown in the drawings. Further, a communication network 73 is configured in the interior of the electric vehicle 10, and the EVCU 40, the brake control unit 50, the inverter 20, the battery control unit 70, the converter 71, and so on are connected to each other via the communication network 73.

Figure 3:
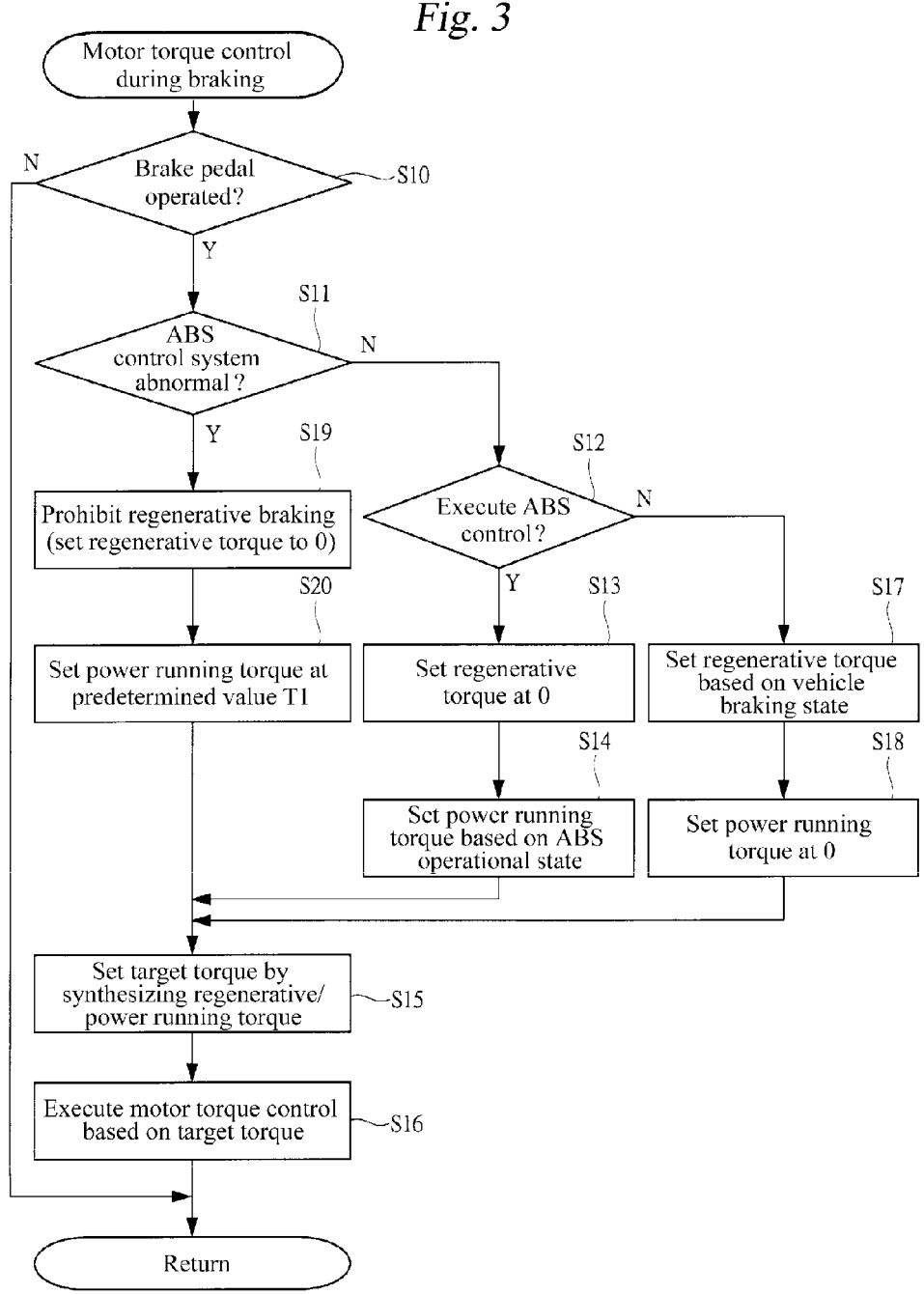
FIG. 3 is a flowchart showing an example of a motor torque control procedure executed during vehicle braking.

Next, motor torque control performed during vehicle braking in which the brake pedal 25 is depressed will be described. FIG. 3 is a flowchart showing an example of a motor torque control procedure executed during vehicle braking. As shown in FIG. 3, in step S10, a determination is made as to whether or not the brake pedal 25 is depressed. When the brake pedal 25 is depressed, the routine advances to step S11, in which a determination is made as to whether or not an abnormality has occurred in the ABS control system, or more specifically whether or not an abnormality has occurred in the vehicle wheel speed sensors 51 to 54, the communication network 73, and so on.

When it is determined in step S11 that the ABS control system is normal, the routine advances to step S12, in which a determination is made as to whether or not a braking condition that requires ABS control is established. In step S12, the brake control unit (slip determining means) 50 estimates the vehicle body speed based on signals from the various sensors, and calculates the slip ratio (slipping tendency) of the vehicle wheels 14 to 17 based on the vehicle body speed and the vehicle wheel speed. When the slip ratio of the vehicle wheels 14 to 17 exceeds a predetermined threshold, or in other words when the vehicle wheels 14 to 17 exhibit a locking tendency, the brake control unit 50 decides to execute ABS control for stabilizing the vehicle behavior by controlling the braking force applied to the vehicle wheels 14 to 17. Having decided to execute ABS control, the brake control unit 50 outputs an ABS operation signal (determination result) indicating that the ABS is operative to the EVCU 40. Note that here, the slip ratio is used as an index indicating the slipping tendency of the vehicle wheels 14 to 17, but the present invention is not limited thereto, and instead, the determination as to whether or not to execute ABS control may be made by determining the slipping tendency of the vehicle wheels 14 to 17 based on a rotation difference between the respective vehicle wheels 14 to 17, for example.

As described above, when it is determined in step S12 that the slip ratio of the vehicle wheels 14 to 17 exceeds the predetermined threshold and it is therefore decided to execute ABS control, the routine advances to step S13, in which the regenerative torque of the motor-generator 11 is set to zero. The routine then advances to step S14, in which the power running torque of the motor-generator 11 is set based on the operational state of the ABS. In step S15, the target torque is set by adding together the regenerative torque and the power running torque, and in subsequent step S16, motor torque control is executed on the motor-generator 11 based on the target torque. Hence, when the ABS control system is functioning normally and ABS control is executed during vehicle braking, the power running torque is output from the motor-generator 11 in accordance with the operational state of the ABS. Accordingly, when the brake oil pressure is reduced by the ABS control, the vehicle wheels 14 and 15 can be restored to a rotational state reliably, and as a result, the vehicle behavior can be stabilized.

When it is determined in step S12 that the slip ratio of the vehicle wheels 14 to 17 is smaller than the predetermined threshold and it is therefore decided not to execute ABS control, the routine advances to step S17, in which the regenerative torque of the motor-generator 11 is set based on the vehicle braking state. The routine then advances to a step S18, in which the power running torque of the motor-generator 11 is set to zero. Next, as described above, the target torque is set by adding together the regenerative torque and the power running torque in step S15, and in following step S16, motor torque control is executed on the motor-generator 11 based on the target torque. Hence, when the ABS control system is functioning normally and ABS control is not executed during vehicle braking, regenerative torque is output from the motor-generator 11 in accordance with the braking state. As a result, regenerative braking is executed by the motor-generator 11 such that kinetic energy from the electric vehicle 10 is converted into electric energy and collected.

Meanwhile, when it is determined in step S11 that an abnormality has occurred in the ABS control system, or in other words it is determined that an ABS operation signal to the EVCU 40 is abnormal, the routine advances to step S19, in which regenerative braking by the motor-generator 11 is prohibited. The routine then advances to step S20, in which the power running torque of the motor-generator 11 is set to a predetermined value T1. Note that the power running torque T1 set in step S20 is a minimum torque required for restoring the vehicle wheels 14 and 15 to a rotational state. Then, as described above, the target torque is set by adding together the regenerative torque and the power running torque in step S15, and in following step S16, motor torque control is executed on the motor-generator 11 based on the target torque.

Hence, when an abnormality occurs in the ABS control system, when the operational state of the ABS cannot be grasped by the EV control unit 40, or when it is suspected that the ABS is not operating normally, regenerative braking by the motor-generator 11 is prohibited regardless of the operating condition of the ABS. By prohibiting regenerative braking by the motor-generator 11 in advance in this manner, the vehicle wheels can be prevented from locking, thereby stabilizing the vehicle behavior, even if the ABS is suddenly operated before the EVCU 40 has received the ABS operation signal, and as a result, the stability of the electric vehicle 10 can be improved. Moreover, the motor-generator 11 is subjected to power driving using the power running torque T1, and therefore the vehicle wheels can be actively restored to a rotational state from a locked state, enabling a further improvement in the stability of the electric vehicle 10.

Figure 4:
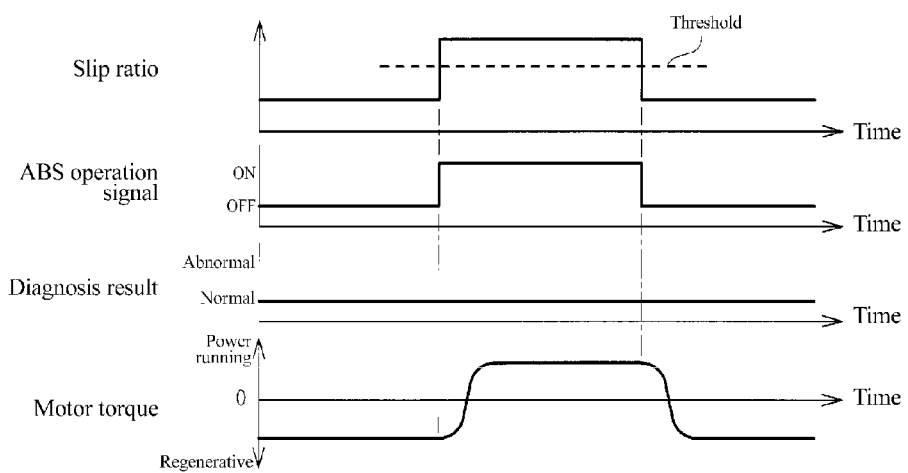
FIG. 4A is a timing chart showing a motor torque control state when an ABS control system is normal.
FIG. 4B is a timing chart showing the motor torque control state when the ABS control system is abnormal.
Figure 4:
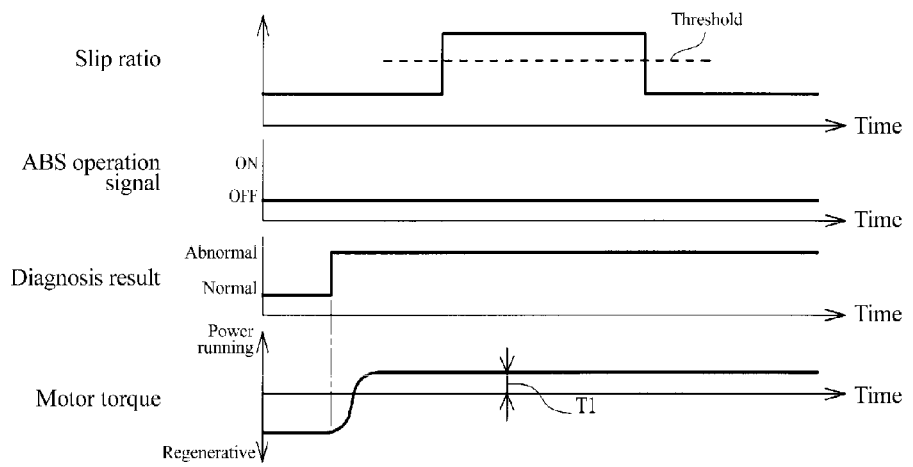
Figure 5:
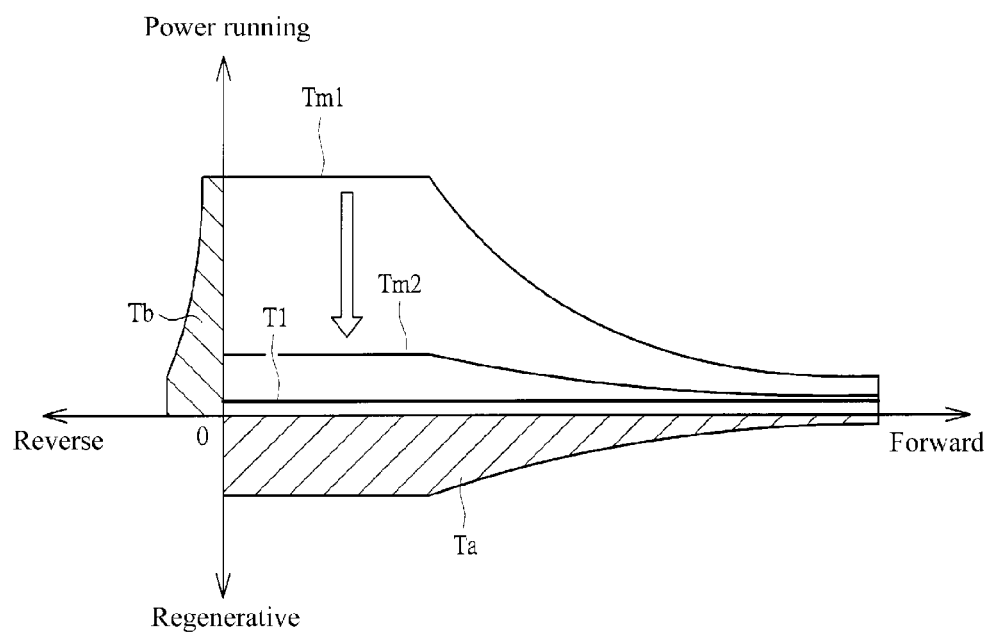
FIG. 5 is an illustrative view showing a torque map of a motor-generator.

FIG. 4A is a timing chart showing a motor torque control state when the ABS control system is normal, and FIG. 4B is a timing chart showing the motor torque control state when the ABS control system is abnormal. Further, FIG. 5 is an illustrative view showing a torque map (power running torque, regenerative torque) of the motor-generator 11. Note that the torque map shown in FIG. 5 is referenced when the select lever 45 has been operated to a drive range.

As shown in FIG. 4A, when a diagnosis result of the ABS control system is normal, the determination as to whether or not to execute ABS control is made based on the slip ratio of the vehicle wheels, and motor torque control is executed based on the operational state of the ABS. More specifically, when the slip ratio is smaller than the predetermined threshold such that ABS control is not executed, the motor-generator 11 is controlled to a regenerative state in which regenerative torque is output, and when the slip ratio exceeds the predetermined threshold such that ABS control is executed, the motor-generator 11 is controlled to a power running state in which power running torque is output.

As shown in FIG. 4B, on the other hand, when the diagnosis result of the ABS control system indicates an abnormality, regenerative braking by the motor-generator 11 is prohibited immediately and the motor-generator 11 is subjected to power driving such that the power running torque T1 is output. More specifically, as shown in FIG. 5, when an abnormality occurs in the ABS control system, setting of regenerative torque values Ta and Tb in the motor-generator 11 is prohibited, and the power running torque of the motor-generator 11 is set to T1. Hence, when an abnormality is found in the ABS control system, the motor-generator 11 is controlled to prevent the vehicle wheels 14 and 15 from locking, and therefore the vehicle behavior of the electric vehicle 10 can be stabilized, leading to an improvement in stability. Note that the regenerative torque Tb shown in FIG. 5 is a torque that is set to prevent the vehicle from moving backward on a steep slope.

As described above, when an abnormality occurs in the ABS control system, the power running torque T1 is output from the motor-generator 11. However, this power running torque is not limited to a fixed value, and may be increased or decreased in accordance with the vehicle speed and a road surface resistance, which serve as traveling conditions. As shown in FIG. 5, for example, when an abnormality occurs in the ABS control system, an upper limit value of the power running torque may be reduced from Tm1 to Tm2 (predetermined values), whereupon the power running torque may be increased and decreased within a range of zero to Tm2 in accordance with the traveling conditions. Further, the reduced upper limit value Tm2 of the power running torque when an abnormality occurs in the ABS control system may be increased and decreased in accordance with traveling conditions such as the vehicle speed and the road surface resistance. Thus, the power running torque of the motor-generator 11 can be controlled appropriately in accordance with the traveling conditions, and as a result, the vehicle behavior can be controlled more appropriately.

Further, the magnitude of the power running torque set when an abnormality occurs in the ABS control system is preferably set such that the torque acting on the vehicle wheels 14 and 15 is zero. In other words, control is preferably performed such that the vehicle wheels 14 and 15 are prevented from either accelerating or decelerating, depending on the power running torque output from the motor-generator 11. In so doing, the vehicle behavior is not destabilized by the motor-generator 11, and as a result, an improvement in steering stability can be achieved. Furthermore, by reducing the power running torque when an abnormality occurs in the ABS control system, a power performance of the electric vehicle 10 can be reduced, and therefore traveling conditions requiring an ABS operation can be prevented in advance and the driver can be notified of the abnormality in the ABS control system.

Moreover, in the above description, regenerative braking by the motor-generator 11 is prohibited when an abnormality occurs in the ABS control system such that the motor-generator 11 is subjected to power driving, but the present invention is not limited thereto, and regenerative braking in the motor-generator 11 may be prohibited such that the motor-generator 11 is controlled to the power running state similarly when an abnormality is found in the VDC control system, or in other words the vehicle wheel speed sensors 51 to 54, the front-rear G sensor 55, the lateral G sensor 56, the steering angle sensor 57, the communication network 73, and so on. By controlling the motor-generator 11 to prevent the vehicle wheels 14 and 15 from slipping similarly when an abnormality is found in the VDC control system, the vehicle behavior of the electric vehicle 10 can be stabilized, enabling an improvement in stability.

The present invention is not limited to the above embodiment, and may be subjected to various modifications within a scope that does not depart from the spirit of the present invention. For example, in the drawings, the present invention is applied to the electric vehicle 10 having only the motor-generator 11 as a power source, but the present invention is not limited thereto and may be applied to a hybrid electric vehicle having the motor-generator 11 and an engine as power sources.

What is claimed is:

1. A control apparatus for an electric vehicle, comprising:
a brake control unit configured to control a friction brake of a vehicle wheel and stabilize a vehicle behavior;
an electric motor that is controlled to be in a power running state in which said vehicle wheel is driven by a power running torque and in a regenerative state in which said vehicle wheel is braked by a regenerative braking with a regenerative torque;
a slip determining unit configured to determine whether or not to operate said brake control device based on a slipping tendency of said vehicle wheel; and
a motor control unit configured to control a driving state of said electric motor based on a determination result from said slip determining device, wherein
said motor control unit prohibits said regenerative braking by said electric motor and sets the power running torque to a value to drive the electric motor, the value being required to restore the vehicle wheel to a rotational state, regardless of an operating condition of the brake control unit controlling the friction brake, when it is determined that said slip determining unit is abnormal based on said determination result.

2. The control apparatus for an electric vehicle according to claim 1, wherein said power running torque of said electric motor is varied based on a traveling condition.

3. The control apparatus for an electric vehicle according to claim 1, wherein said motor control unit controls a torque acting on said vehicle wheel toward zero by controlling said electric motor to said power running torque that is no greater than said predetermined value.

4. The control apparatus for an electric vehicle according to claim 1, wherein said brake control device is an antilock brake control device configure to prevent said vehicle wheel from locking during vehicle braking.

5. The control apparatus for an electric vehicle according to claim 1, further comprising a vehicle wheel speed sensor, wherein said motor control unit determines that said determination result from said slip determining unit is abnormal when an output voltage of the vehicle wheel speed sensor is out of a prescribed range.

6. The control apparatus for an electric vehicle according to claim 1, further comprising an EV control unit including said motor control unit, wherein the brake control unit includes the slip determining unit, the EV control communicates with said brake control unit, said motor control unit determines that said determination result from said slip determining unit is abnormal when a communication abnormality is detected between said brake control unit and said EV control unit.

* * * * *